US009444747B2

(12) United States Patent
Mattsson et al.

(10) Patent No.: US 9,444,747 B2
(45) Date of Patent: Sep. 13, 2016

(54) SERVICE SPECIFIC TRAFFIC HANDLING

(71) Applicant: Telefonaktiebolaget L M Ericsson (publ), Stockholm (SE)

(72) Inventors: Ulf Mattsson, Kungsbacka (SE); Victor Manuel Avila Gonzalez, Madrid (ES); Daniel Mcgillivray, Vallda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 115 days.

(21) Appl. No.: 14/237,914

(22) PCT Filed: Feb. 6, 2014

(86) PCT No.: PCT/EP2014/052319
§ 371 (c)(1),
(2) Date: Feb. 10, 2014

(87) PCT Pub. No.: WO2015/113646
PCT Pub. Date: Aug. 6, 2015

(65) Prior Publication Data
US 2015/0215219 A1 Jul. 30, 2015

(30) Foreign Application Priority Data
Jan. 30, 2014 (WO) .................. PCT/EP2014/051857

(51) Int. Cl.
H04L 12/28 (2006.01)
H04L 12/859 (2013.01)
H04L 12/857 (2013.01)
H04L 12/24 (2006.01)
H04L 12/947 (2013.01)
H04L 12/741 (2013.01)
H04L 29/06 (2006.01)
H04L 29/12 (2006.01)

(52) U.S. Cl.
CPC ....... *H04L 47/2475* (2013.01); *H04L 41/0893* (2013.01); *H04L 45/745* (2013.01); *H04L 47/2491* (2013.01); *H04L 49/25* (2013.01); *H04L 69/00* (2013.01); *H04L 61/6063* (2013.01)

(58) Field of Classification Search
None
See application file for complete search history.

(56) References Cited

U.S. PATENT DOCUMENTS

| 6,449,251 | B1 | 9/2002 | Awadallah et al. | |
|---|---|---|---|---|
| 6,973,488 | B1 * | 12/2005 | Yavatkar et al. | 709/223 |
| 2003/0033421 | A1 * | 2/2003 | Haeri et al. | 709/232 |
| 2005/0018651 | A1 | 1/2005 | Yan et al. | |
| 2006/0045098 | A1 * | 3/2006 | Krause | 370/396 |
| 2011/0219145 | A1 * | 9/2011 | Pope et al. | 709/250 |

* cited by examiner

*Primary Examiner* — Chi H Pham
*Assistant Examiner* — Shick Hom
(74) *Attorney, Agent, or Firm* — Coats & Bennett, PLLC

(57) ABSTRACT

An application executing on a device communicates packet data with a server via an operating system (OS) on the device. The device receives information concerning a port mapping policy that specifies a plurality of applications. For each application, a predetermined assignable port space is defined within which an application specific port can be assigned. When the application is started, an OS specific port is assigned to the application. Additionally, an application specific port for the OS specific port is assigned in accordance with the port mapping policy. The device then translates data packets to be transmitted by the application, such that for a given OS specific source port, the device replaces the OS specific source port field of the packets to be transmitted with the assigned application specific port. The device then transmits the translated data packets with the assigned application specific source port.

11 Claims, 12 Drawing Sheets

| APP | P_OS | P_APP (SOURCE PORT) | P_SERV (DEST. PORT) |
|---|---|---|---|
| ZOLO | 0950 | 40003 | xxxxx |
| NETFLIX | 1231 | 52500 | xxxxx |
| SKYPE | 1280 | 63333 | xxxxx |
| CHROME |  | - | 80 |

Fig. 7 – ASSIGNED SOURCE PORT

| APP | ASSIGNABLE PORT SPACE | |
|---|---|---|
| ZOLO | 40001 | 50000 |
| NETFLIX | 50001 | 60000 |
| SKYPE | 60001 | 70000 |
| CHROME | 70001 | 80000 |

P_APP_R

PPOL

Fig. 6

| APP | ASSIGNABLE PORT SPACE | |
|---|---|---|
| ZOLO PAR CTRL | 40050 | 40051 |
| NETFLIX DPI | 50011 | 50020 |
| NETFLIX HISTREAM | 50021 | 50030 |
| ... | | |
| SKYPE | 60001 | 70000 |

PPOL_SUBS FOR DEVICE

| APP | ASSIGNABLE PORT SPACE | |
|---|---|---|
| ZOLO PAR CTRL | 40050 | 40051 |
| ZOLO DPI | 40052 | 40053 |
| ZOLO HISTRM | 40054 | 40054 |
| ... | | |
| NETFLIX PAR CTRL | 50001 | 50010 |
| NETFLIX DPI | 50011 | 50020 |
| NETFLIX HISTREAM | 50021 | 50030 |
| ... | | |
| SKYPE | 60001 | 70000 |

PPOL_MASTER

SERVICE SPECIFIC TRAFFIC HANDLING

TECHNICAL FIELD

This invention is directed to the field of handing packet traffic concerning specific applications or services in wired and wireless networks. More particularly, the invention relates to systems, apparatuses and methods in which an operator wants to handle service- or application-specific traffic in a special way.

BACKGROUND

So-called over the top services (OTT) in cellular wireless networks are services which a cellular operator may offer to the subscriber or user that may be offered by a third party. Such services could typically concern internet content such as video and audio for instance as internet television, IPTV and music—as well as text and pictures.

Operators have a large interest in being service aware; that is; to be able to differentiate services delivered for various applications, apps, or OTT services. This special service delivery may be a better quality of service, differentiated charging, etc.

In order to perform differentiated Service Delivery, it is key to identify the traffic that belongs to the Service. There are different known ways to identify such traffic as discussed in the following under items 1-4:
1. Use a specific Access Point Name, APN, per application. There a several issues with this approach:
a. The terminal must be configured to use a different APN per application.
b. It is not feasible if the different Quality of Service, QoS, /Charging should be applied per subscriber
c. It requires multiple PDN connections and, therefore, multiple IPs.
2. Use a 3GPP Rx interface from Application Server to an Operator Policy and Charging Rules Function, PCRF. The main drawback is that this solution implies that all application servers, and there might hundreds for a single application, should be connected with all the PCRFs of all Operators they have an agreement with. This is extremely costly to deploy and there currently is no real example of such deployment even if the technology has been available for a number of years
3. Solutions based on Deep Packet Inspection, DPI. In many cases the traffic needs to be identified through heuristic methods as the protocol is not public. DPI may, depending on the application, not be sufficiently accurate and therefore not suitable if there is a commercial agreement.
4. Solutions for Software Defined Networks, SDNs, require identifying traffic that belongs to a specific service. This is usually done through deep packet inspection, DPI, to identify the set of 5 tuples corresponding to the IP flows that a specific terminal has opened for the service in question. The set of 5-tuples are sent to a central entity, which uses that information to create a chain that is provisioned in all the open flow switches that belong to that chain. This result in a somehow excessive signalling traffic communication between entities and the solution may not be scalable.

SUMMARY

It is a first object of the invention to set forth a method for a device which obviates some of the problems stated above.

This object has been accomplished by a method for a device, such as a terminal device, comprising a memory and a processor, the processor being adapted for running a an operating system, OS, through which an application, APP, can be executed, the application permitting packet data to be provided to or from the device and a server.

The OS is interacting with the APP using at least an OS specific port number when executing the APP.

The device is being adapted for
receiving information concerning a port mapping policy that specifies a plurality of applications, wherein for each application a predetermined assignable port space is defined within which an application specific port can be assigned;
starting an application;
having an OS specific port assigned to the started application;
assigning an application specific port for the OS specific port in accordance with the port mapping policy. The device is further being adapted for
translating, for traffic relating to the stated application, internet packets to be transmitted for the started application, such that for a OS specific source port, the OS specific source port of packets to be transmitted is exchanged with the assigned application specific port,
transmitting the translated traffic with the assigned application specific source port.

There is also provided a method for a port mapping policy entity,
defining a port mapping policy that specifies a plurality of applications, wherein for each application a predetermined assignable port space is defined within which an application specific port can be assigned, the port mapping policy entity further
transmitting the port mapping policy to a network entity.

Further a method for a network entity, is provided adapted for communicating internet traffic between servers on the internet and a device, the method comprising
receiving a port mapping policy, that specifies a plurality of applications, wherein for each application a predetermined assignable port space is de-fined within which an application specific port can be assigned. The method further comprises
receiving traffic such as application session traffic,
identifying source port numbers for the traffic,
performing application specific actions for the received traffic based on the source port identified for the traffic.

There is also provided a method for a network entity, adapted for communicating internet traffic to and from servers on the internet and to and from a device, the method comprising
receiving a port mapping policy, that specifies a plurality of applications, wherein for each application a predetermined assignable port space is de-fined within which an application specific port can be assigned,
receiving traffic, such as application session traffic,
performing deep packet inspection, DPI, on the received traffic, identifying a started application for which an OS specific port has been assigned to a started application,
assigning an application specific port for the OS specific port in accordance with the port mapping policy;
translating, for traffic relating to the stated application, internet packets to be transmitted for the started application, such that for a OS specific source port, the OS specific source port field of packets to be transmitted is exchanged with the assigned application specific port,
transmitting the translated traffic with the assigned application specific source port.

Still further, the objects defined above is also accomplished by means of a method for a switch in a software defined network, SDN, wherein the SDN comprises a service chaining application which defines traffic paths in the SDN executed by the switch and further switches, the method comprising
  identifying source port numbers for the traffic,
  performing application specific actions for the received traffic based on the source port identified for the traffic.
Further the object above is achieved by corresponding apparatuses.

Hence there is provided device, DEV, such as a terminal device, comprising a memory and a processor, the processor being adapted for executing an operating system, OS, whose instructions are stored in the memory, through which OS an application, APP, can further be executed, the application permitting packet data to be provided to or from the device and a server.

The OS interacting with the APP using OS specific port numbers when executing the APP. The device being operative to
  receiving information concerning a port mapping policy that specifies a plurality of applications, wherein for each application a predetermined assignable port space is defined within which an application specific port can be assigned;
  starting an application;
  having an OS specific port assigned to the started application.
The device is—assigning an application specific port for the OS specific port in accordance with the port mapping policy;
the device is adapted for—translating, for traffic relating to the started application, internet packets to be transmitted for the started application, such that for an OS specific source port, the OS specific source port field of packets to be transmitted is exchanged with the assigned application specific port, and the device;
  transmitting the translated traffic with the assigned application specific source port.

A port mapping policy entity is moreover provided comprising a memory and a processor adapted to carry out instructions stored in the memory.
The port mapping policy entity is being operative to
  defining a port mapping policy that specifies a plurality of applications, wherein for each application a predetermined assignable port space is defined within which an application specific port can be assigned,
and is operative to—transmitting the port mapping policy to a network entity.

A network entity, NE, is shown comprising a memory and a processor adapted to carry out instructions stored in the memory, the network entity being operative to communicating internet traffic between servers on the internet and a device. The network entity being operative to
  receiving a port mapping policy, that specifies a plurality of applications, wherein for each application a predetermined assignable port space is de-fined within which an application specific port can be assigned,
  receiving traffic such as application session traffic,
  identifying source port numbers for the traffic,
  performing application specific actions for the received traffic based on the source port identified for the traffic.

A further network entity is provided, comprising a memory and a processor adapted to carry out instructions stored in the memory, and comprising a DPI unit and a NAT unit. The network entity being operative to communicating internet traffic to and from servers on the internet and to and from a device, and further to
  receiving a port mapping policy, PPOL, that specifies a plurality of applications, wherein for each application a predetermined assignable port space is defined within which an application specific port can be assigned,
  receiving traffic, such as application session traffic,
  performing deep packet inspection, DPI, on the received traffic, identifying a started application for which an OS specific port has been assigned to a started application,
  assigning an application specific port for the OS specific port in accordance with the port mapping policy;
  translating, for traffic relating to the started application, internet packets to be transmitted for the started application, such that for a OS specific source port, the specific source port is exchanged with the assigned application specific port,
  transmitting the translated traffic with the assigned application specific source port.

Concerning an embodiment involving a Software Defined Network, SDN, there is provided a switch of such a SDN. The SDN comprises a service chaining application (91) which defines traffic paths in the SDN executed by the switch and further switches, the switch being adapted to
  identifying source port numbers for the traffic,
  performing application specific actions for the received traffic based on the source port identified for the traffic.

The above object is also accomplished by means of a system comprising a device, such as a terminal device, comprising a memory and processor, the processor being adapted for running an operating system, OS whose instructions are stored in the memory and through which OS an application can be executed, the application permitting packet data to be provided to or from the device and a server, a port mapping policy entity and a network entity NE adapted for communicating internet traffic between servers on the internet and a device, the device being operative to
  defining a port mapping policy that specifies a plurality of applications, wherein for each application a predetermined assignable port space is defined within which an application specific port can be assigned, the port map-ping policy entity,
  transmitting the port mapping policy to a network entity.
  transmitting the port mapping policy, or a subset thereof, to a device.
  receiving information concerning a port mapping policy that specifies a plurality of applications, wherein for each application a predetermined assignable port space is defined within which an application specific port can be assigned; the device,
  starting an application;
  having an OS specific port assigned to the started application;
  assigning an application specific port for the OS specific port in accordance with the port mapping policy;
  translating, for traffic relating to the stated application, internet packets P to be transmitted for the started application, such that for a OS specific source port, the application specific source port field of packets to be transmitted is exchanged with the assigned application specific port,
  transmitting the translated traffic with the assigned application specific source port,
  receiving traffic such as application session traffic, by the network entity,
  identifying source port numbers for the traffic, performing application specific actions for the received traffic based on the source port identified for the traffic.

The embodiments of the invention are adapted to be carried out by means of a program or computer program claims. Alternatively, functions are implemented by function modules having corresponding functions as defined for the method steps shown in the following detailed description.

Embodiments of the invention provide for a very efficient handling of service specific traffic handling.

BRIEF DESCRIPTION OF THE DRAWINGS

FIG. 6 is an exemplary table relating to a port policy according to an aspect of the invention, FIG. 7 is an exemplary table relating to a port policy implementation in a device according to an aspect of the invention, FIG. 13 shows a known IPv4 header format.

DETAILED DESCRIPTION

Figure 1:
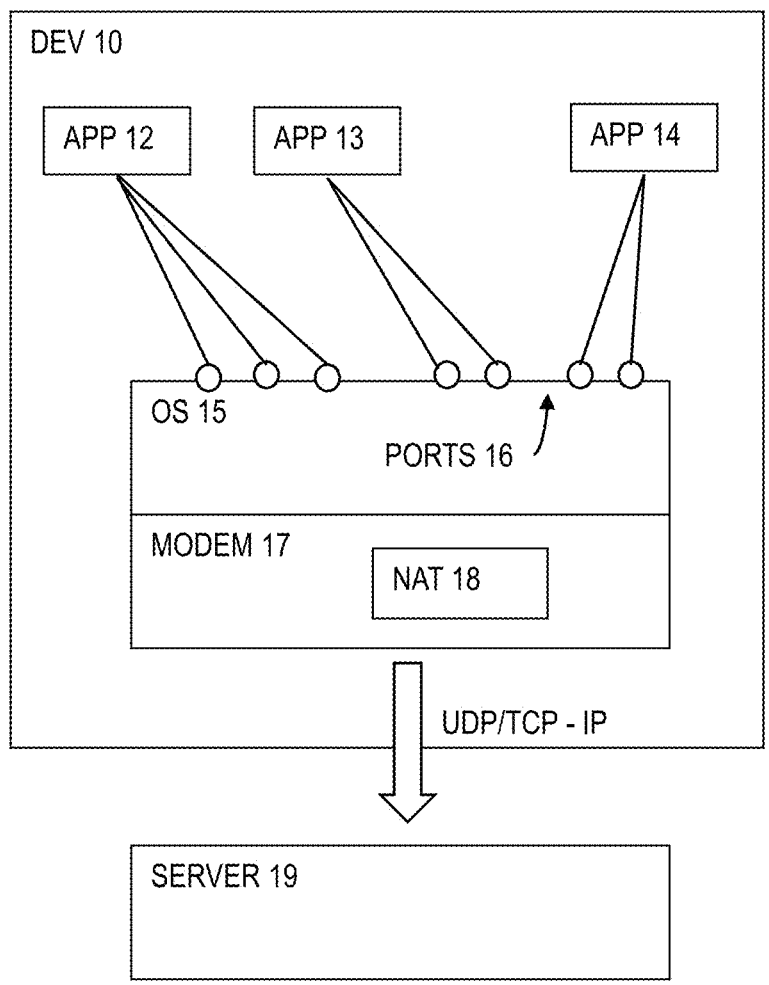
FIG. 1 shows basic elements of a computing device involving ports communicating with a server.

FIG. 1 shows a reference system in relation to which features and effects of the invention can illustrated. The reference system comprises a device, DEV, 10, such as computer or a wireless unit comprising an operating system, OS, 15 and a modem 17. On the OS 15, a number of software applications, apps, APP—12, 13 and 14 are running under the control and execution of the OS. Internet packets are transferred e.g. from the apps further to e.g. at least a server 19 on the internet. Each application may be associated with its own flow of IP packets. Ports 16 are therefore used in addition to the IP address of the DEV to identify the application(s) running on the DEV. The OS assigns ports of specific numbers to the apps. Thereby, the OS can control communication to and from the apps. As indicated in FIG. 1, for each app there may be defined several port numbers. The various ports enable Internet streams not only to be delivered to the various apps, but even subroutines/modules of the same app. The modem 16 may comprise a network address translation function, NAT, 18 in which among others OS port specific (destination) numbers are exchanged with other port (destination) numbers.

As is known, for communicating a packet from an app on a device to a server, the following is needed: The device has one source IP-address and at least one TCP/UDP source port. The server has one destination IP-address and one TCP/UDP destination port. Returning a packet from the server to the device to the correct app is accomplished by interchanging source and destination in the packet, both for the IP addresses and the TCP/UDP ports. Further, certain traffic can be identified and distinguished from other types of traffic based on destination port numbers. Ports in the range 0-1024 may identify known server based services such as FTP, SSH, TELNET etc. as is known in the art.

However, the applications associated on the DEV cannot be used for predefined ports, for instance in a system as depicted in FIG. 1, because that is not how the OS would assigns them. In the above example of FIG. 1, there are only certain types of traffic that would be associated with port numbers, i.e. known port numbers in the range of 0 to 1024.

According to aspects of the invention the following applies:
  A port mapping policy is provided that is distributed and can be dynamically updated at regular intervals;
  Traffic identification is based on the source port of a client application, not a server's service;
  The communication between one DEV and the internet for certain applications which reside on the DEV (OTT/Apps) and their corresponding sessions is controlled according to the traffic identification based on respective source port numbers.

To distinguish the applications and their corresponding sessions from other application sessions, a port mapping entity, according to the invention, for instance residing on the DEV ensures that all communication for the targeted app occurs on ports defined by the port mapping policy. A port mapping entity and the port mapping policy is also present on the network element responsible with handling the session's payload data which e.g. could be a GGSN.

According to an aspect of the invention, the port mapping policy is for instance known to both the port mapping entity on the DEV and the port mapping entity in the network element. This port mapping policy is preferably distributed from a central instance to the network elements and to the DEV and may then be updated at regular intervals, e.g. to avoid security vulnerabilities. The mapping policy may be distributed to the DEV at attach of the DEV and/or at certain time intervals or similar, e.g. determined by the DEV and/or a central instance in the network, e.g. the central instance responsible for distributing port mapping policies.

The port mapping entity in the DEV first identifies the app attempting to connect to the network. The identification procedure may for instance be implemented as described in WO2014/009044 published 2014 Jan. 16. If the app in question is present in the mapping policy, then the entity will ensure that the correct port is selected by the app through:
  Mapping the port used by the targeted apps TCP or UDP packets, to the app specific port as specified in the mapping policy residing on the DEV. The mapping activity is similar to network address translation (NAT). The mapping entity can reside in a secure area on the modem.
  Providing the app specific port to the app, when the app requests a port for communication using UDP or TCP from the OS. The mapping entity will be integrated in the OS in a secure manner.

When the session data, both uplink and downlink, reaches the network element concerned with distinguishing the targeted apps sessions, this element will be able to identify the sessions based on the port in the 5 tuple of the applications UDP or TCP packet The network element is able to do this because it has access to the common port mapping policy and can conduct shallow packet inspection to retrieve the 5 tuple information. This will enable the network element to take appropriate action on the session's traffic based on the port number, whether it is to change the QoS, change the charging rate or other action, such as actions in a software defined network, SDN. The use of port number and port number mapping in the DEV and the network elements provides a simple and efficient manner of associating a packet flow with a certain application. For example, a GGSN or a PGW can enforce a particular QoS and/or charging or similar for a certain packet flow based on the port number associating the packet flow with a certain application. The port number can be easily retrieved by shallow packet inspection or similar. This is an improvement compared to the prior art methods for associating a packet flow with a certain application described above in the background section under items 1-4.

Figure 2:
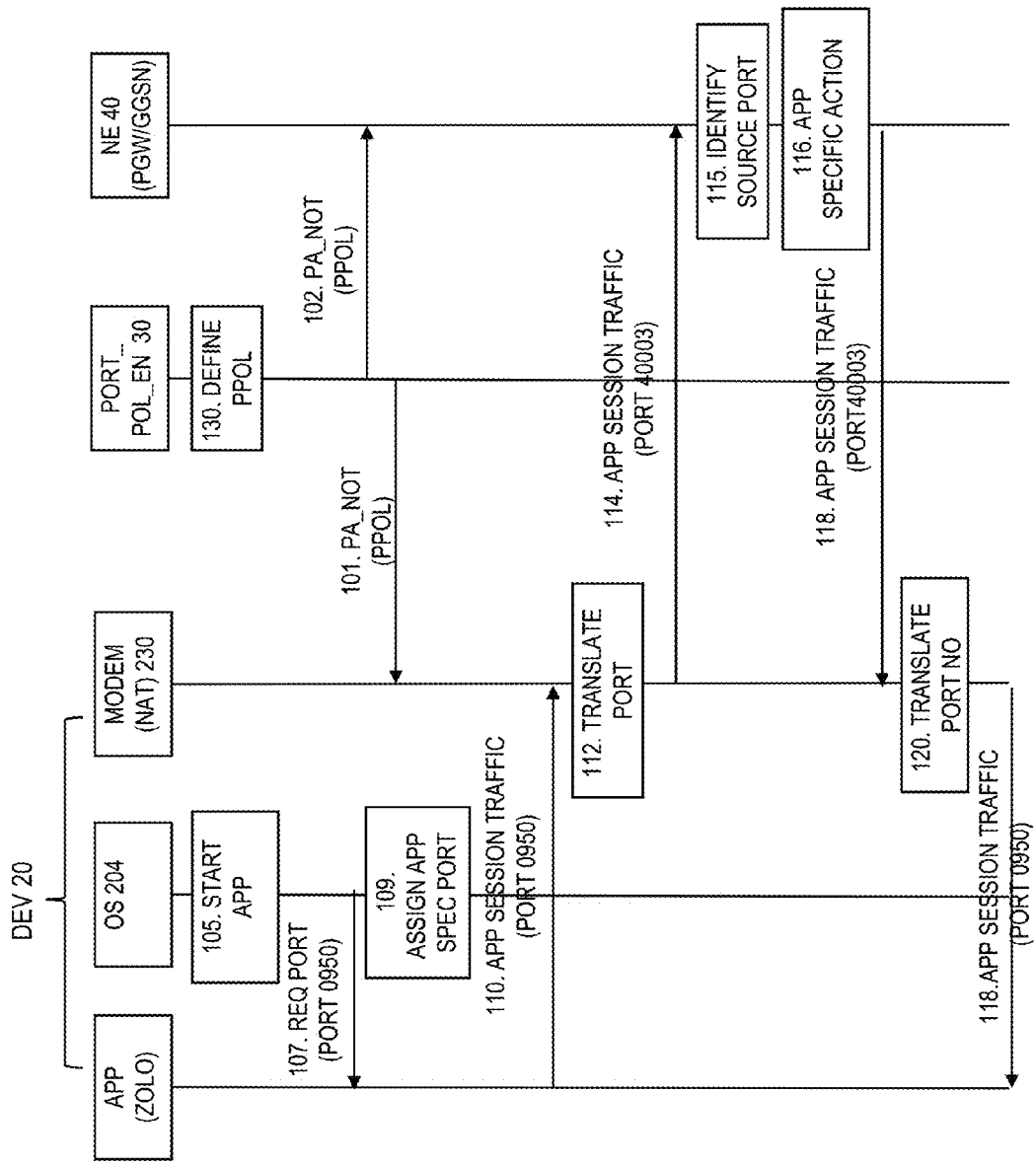
FIG. 2 shows a first embodiment of a method according to the invention.

In FIG. 2, a first embodiment is shown for a method in which a device 20 communicating with a network entity 40 and a port policy entity, 30.

The port mapping policy entity PORT_POL_EN, 30, is
defining 130 a port mapping policy PPOL, that specifies a plurality of applications, wherein for each application a predetermined assignable port space is defined within which an application specific port P_APP can be assigned.

In step 102, the port policy entity is
transmitting the port mapping policy to the network entity 40.

Moreover the port policy entity is
transmitting 101 the port mapping policy, or a subset thereof, to the device 20.

The device, DEV 20, which could be a terminal device having user entity functionality according to 3GPP 3G/LTE (3$^{rd}$ generation/Long Term Evolution) standards. The device 20 comprises a memory 206 and processor 208 as will be further discussed in connection with FIG. 14. The processor is being adapted for running an operating system, OS 204, through which an application, APP (e.g. Zolo), can be executed. The application is permitting packet data to be provided to or from the device and a server. In this example, the device may comprise a modem 230 interacting with a Network Address Translation unit NAT 220 in the device. For instance, the application could be implemented under the Android operating system or the IOS (iPhone OS) operating system in so far the device is complying with such systems.

The network entity, NE, 40, which for instance could have Packet Data Network functionality, PGW, or Gateway GPRS Support Node, GGSN, functionality according to 3GPP 3G/LTE (3rd generation/Long Term Evolution) standards, is adapted for communicating internet traffic between servers on the internet and the device 10, 20. The network entity 40 undertakes the method steps of receiving 102 the port mapping policy PPOL, from the port policy entity 30, mentioned above.

The OS 204 of the device 20 is interacting with the APP using OS specific port numbers when executing the APP and the device is being adapted for receiving the PPOL 101 information, for instance by the message PA_NOT concerning a port mapping policy PPOL, from the port policy entity 30.

In step 105, the device is starting 105 an application APP_S, here by means of example, an app denoted Zolo which appears in the PPOL;

an OS specific port P_OS is thereby assigned 107 to the started application as is current practice in the art APP_S. By way of example in FIG. 2, the OS specific port 0950 is assigned. The assignment may for instance follow from the OS 204 requesting a port from the app in step 107. Subsequently, the method steps are undertaken of the OS assigning 109 an application specific port P_APP for the OS specific port P_OS in accordance with the port mapping policy PPOL the device received earlier. In this example, the assignable port 40003 is assigned. In some cases, more possibilities for assignment are provided for within the assignable space provided for in the PPOL.

Subsequently, the device 20 is undertaking the method steps of the APP transmitting 110 app session traffic to the OS 204 with OS specific source port 0950. The OS forwards in this example the traffic to the modem 230.

The modem 230 in turn, is translating 112, by way of NAT 220 in the device, for traffic relating to the stated application, internet packets P to be transmitted, such that for a OS specific port P_OS, the application specific source port field of internet packets to be transmitted is provided with the assigned application specific port P_APP. In this example source port 0950 is exchanged with source port 40003, and the application session traffic, in this case related to Zolo, is—transmitted 114 from the device the translated traffic with the assigned application specific source port and then delivered to the network entity 40.

Subsequently, the network entity 40 is
receiving 114 the session traffic,
identifying 115 the source port number for the traffic,
performing 116 application specific actions for the received traffic based on the source port identified for the traffic.

The application specific actions may comprise at least one of
dedicated bearer establishment,
QoS setting,
zero charging.

The application is forwarded further to servers on the Internet (not shown) and a response is returned with application session traffic 118. This traffic is received by the device 20, which translates 120, the application specific port number, in this case 40003 (now being a destination port number for the returned packet) back to the OS specific port number, in this case 0950, which can be delivered to the APP, Zolo.

Figure 3:
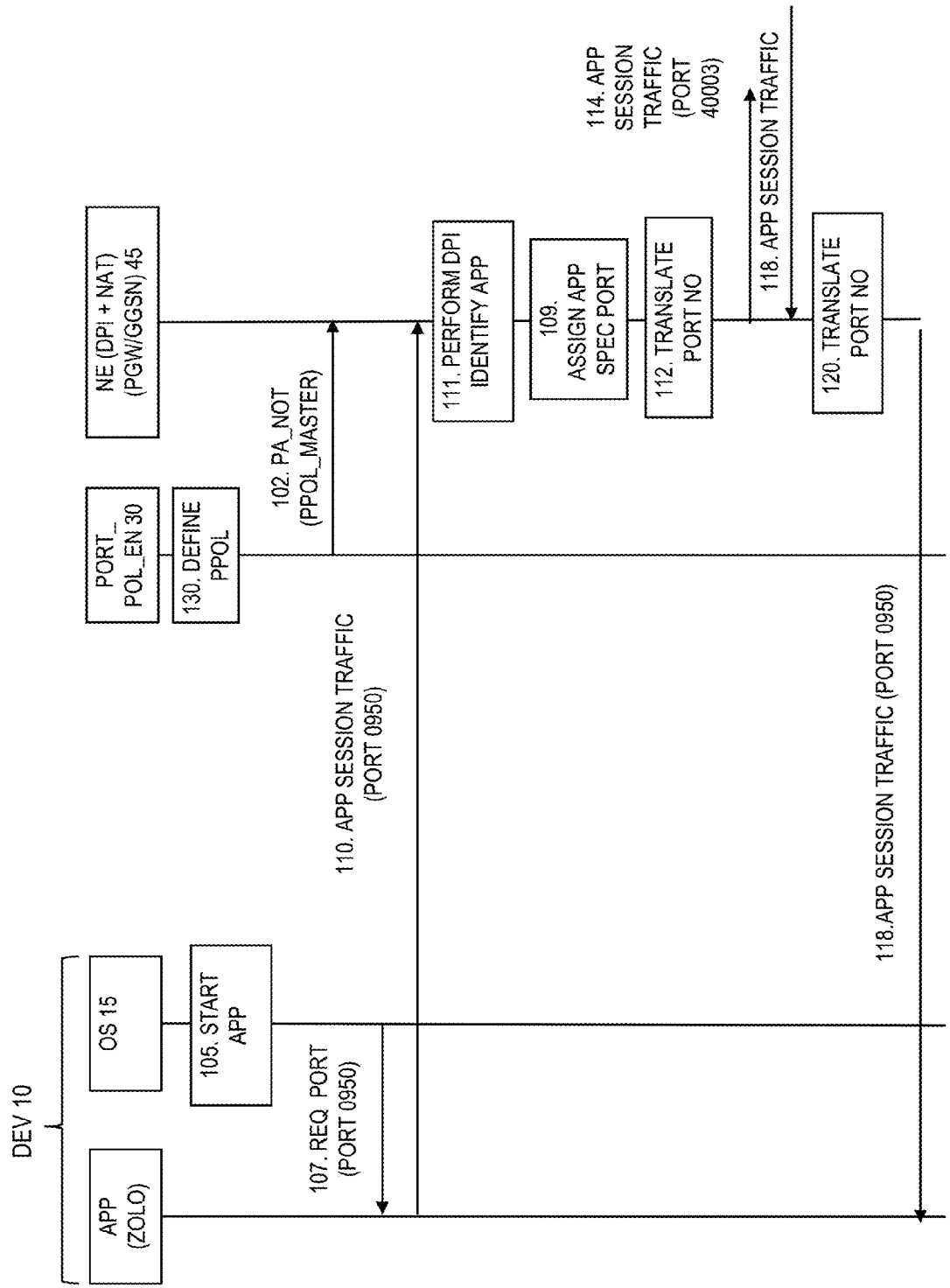
FIG. 3 shows a second embodiment of a method according to the invention.

In FIG. 3, a further embodiment is shown in which a device 10 as shown in FIG. 1 is communicating with port policy entity 30, as described above, and a network entity 45.

The network entity 45, which is further described in connection with FIG. 15, comprises a memory 406 and a processor 408. The port policy entity 45 may comprise a packet processing unit 404 and a network entity port mapping entity 406 for holding a port mapping policy PPOL as discussed above and moreover comprises a DPI unit 410 and a NAT unit 420.

In step 102, the port policy entity 30 is transmitting a port mapping policy, for instance the master port mapping policy, PPOL_MASTER shown in FIG. 8 below to the network entity 45, which in turn registers the information.

Further in FIG. 3, the OS 15 of the device 10 is starting an application in step 105 and is requesting a port from the application. Again, an exemplary application specific source port 0950 is assigned in the device and application specific traffic 110 is transmitted to the network entity 45 now with unprocessed the OS specific source port.

When traffic is reaching the network entity 45, it performs deep packet inspection 111 for identifying the app which the packet or packets of the traffic may concern.

The network entity 45 looks up in the registered port mapping policy PPOL and assigns 109 an application specific port for the detected application.

The network entity is further translating traffic relating to an identified application according to the assigned application specific port in the same manner as explained under step 112 in FIG. 2, that is, the network entity 45 replaces the OS specific source port with the assigned application specific source port.

Subsequently, application session traffic is forwarded 114, with the assigned application specific source port.

When traffic is returned from a server (not shown) 118, the network entity performs reversal of the received, and previously assigned, application specific port with the previous OS specific port, such that the traffic can be delivered back to the correct application.

Figure 4:
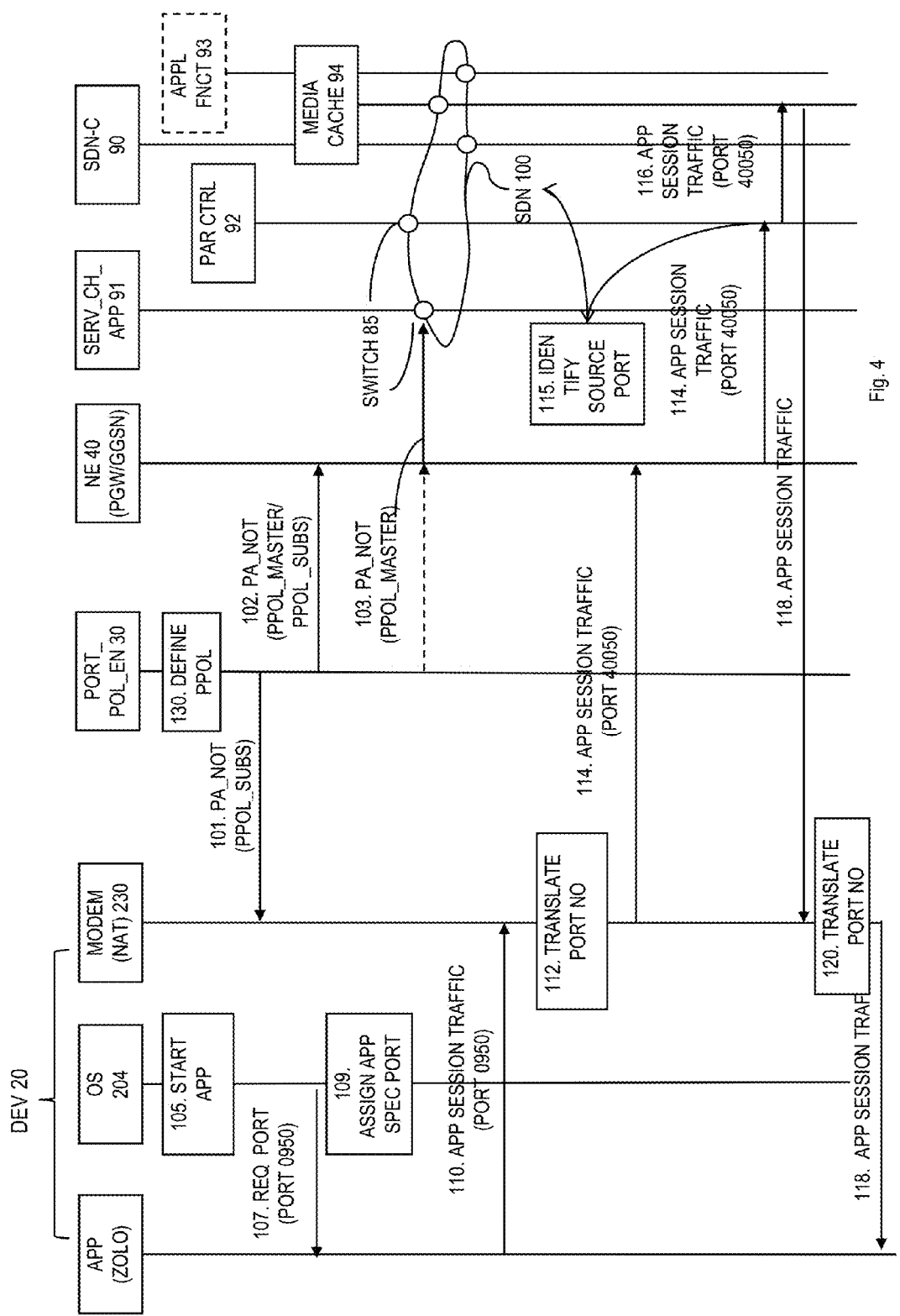
FIGS. 4-5 shows a third and a fourth embodiment of a method according to invention.

In FIG. 4, a further embodiment is shown which relates to the embodiment shown in FIG. 2. The particular features and functions of the FIG. 4 embodiment having the same reference numbers as explained in connection with FIG. 2 shall not be repeated since those features and functions contain similar features and functions.

Figure 5:
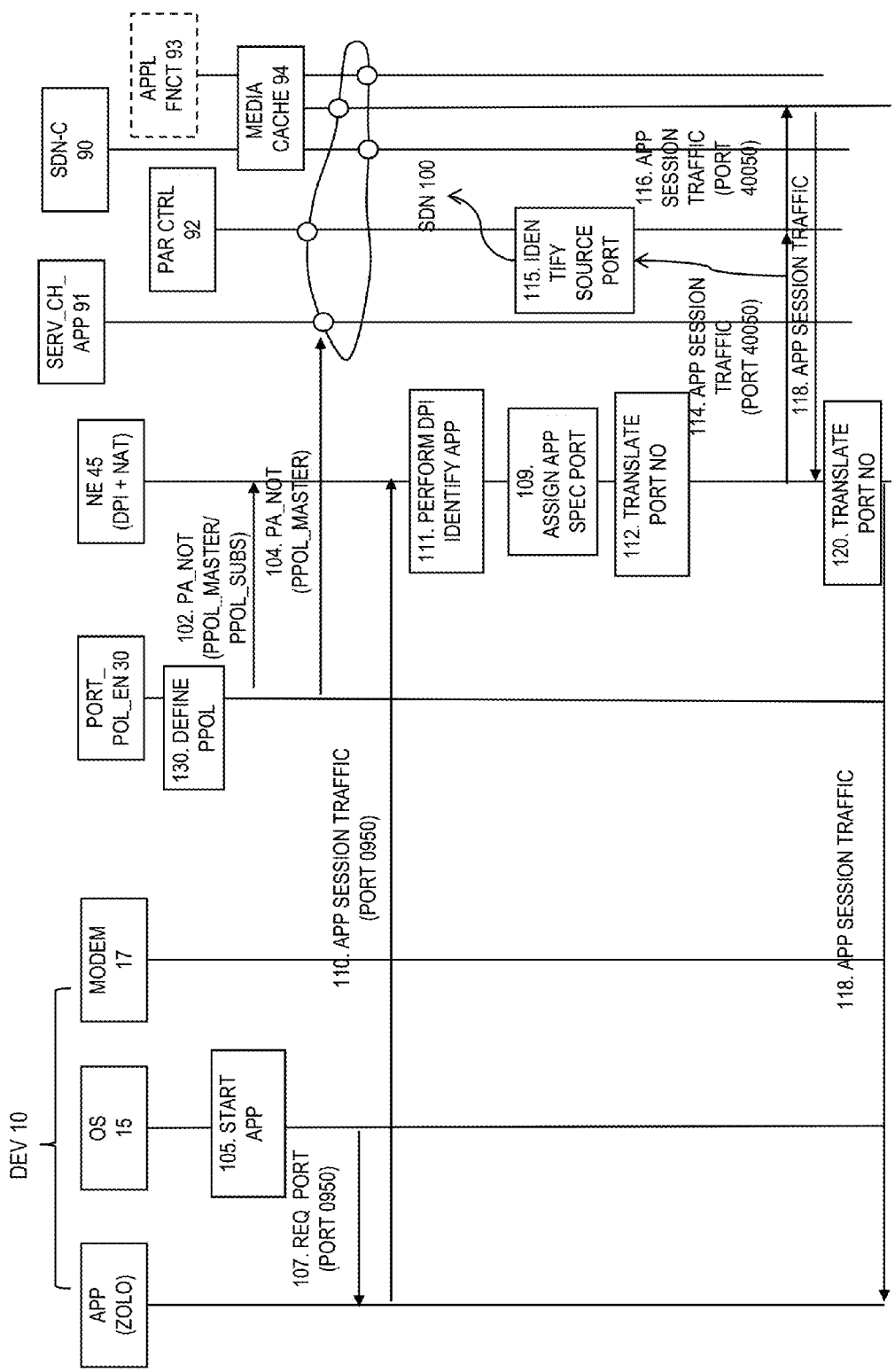

As shown in FIGS. 4 and 5, a software defined network, SDN 100, comprises exemplary servers, such as service chaining application, SEV_CH_APP, 91, for performing service chaining; parental control server, PAR_CTRL 92, performing parental control actions such as—purely by example—controlling that age restricted material is not distributed to minors, application function, APPL FNCT 93, for performing various specific application functions, media cache server, MEDIA CACHE, 94, and a server 90 controlling the overall functionality for the SDN, and software defined network control server, SDN-C. The above servers are meshed together or interconnected by means of a number of open flows switches 85, defining ingress and egress points so that respective optimized paths from and between various servers in the SDN 100, which is defined for specific predefined services in question, can be obtained for traffic flowing in the SDN. The service chaining application 91 defines traffic paths in the SDN executed by the switches 85. The service chaining application 91 is adapted for receiving a port mapping policy PPOL for at least a plurality of devices and the service chaining application 91 is controlling the forwarding table of switches 95 so as to control the traffic path for applications defined in the port mapping policy PPOL.

In FIG. 4, the PPOL is provided further from the NE 40 to the SDN 100 in step 103. Alternatively, the PPOL is provided directly to the SDN. The PPOL master table may be provided to the network entity and the SDN network. Alternatively, a somehow smaller subset PPOL_SUB may be delivered to the NE in so far this entity serves a restricted number of applications.

When application session traffic 114 is reaching a switch 75 in the SDN 100, the switch in question
- identifies 115 source port numbers for the traffic, after receiving the application session traffic 114 and is
- performing 116 application specific actions for the received traffic based on the source port identified for the traffic. The traffic is subsequently routed in the SDN as defined by the service chaining application 91.

This leads to a very effective implementation of application specific path switching in the SDN.

Application session traffic 118 is returned back to the device 20, which performs the reverse translation 120 as explained in connection with FIG. 2, such that it can reach the correct original application running in the device.

In FIG. 5, a further embodiment is shown which involve the SDN explained above in connection with FIG. 4 and the translation being performed in network entity 4, as explained in connection with FIG. 3.

FIG. 5 shows a method for a network entity NE, 45, adapted for communicating internet traffic to and from servers on the internet and to and from a device 10, 20, the method comprising
- receiving 102 a port mapping policy PPOL, that specifies a plurality of applications, wherein for each application a predetermined assignable port space is defined within which an application specific port P_APP can be assigned,
- receiving 110 session traffic,
- performing 111 deep packet inspection, DPI, on the received traffic, identifying a started application for which an OS specific port P_OS has been assigned 107 to a started application APP_S,
- assigning 109 an application specific port P_APP for the OS specific port P_OS in accordance with the port mapping policy PPOL;
- translating 112, for traffic relating to the stated application 110, internet packets P to be transmitted for the started application, such that for a OS specific source port P_OS, the OS specific source is exchanged with the assigned application specific port P_APP,
- transmitting 114 the translated traffic with the assigned application specific source port.

FIG. 6 is an exemplary table relating to a port policy according to an aspect of the invention. The port policy, PPOL, defines an assignable address space for a plurality of applications. Purely by means of example, applications Zolo, Netflix, Skype and Chrome are shown. Such applications are available through the Android OS and can be downloaded on a wireless terminal device on the Internet. It is understood that the PPOL could include a high number of applications of for example several thousand applications and that only for reasons of illustration a smaller number is shown.

For each application an assignable port range P_APP_R, which need not be contiguous, or space is defined. For instance, the application Zolo can be assigned source numbers, denoted, in the port space 40001-5000 under the PPOL in question.

FIG. 7 is an exemplary table relating to a port policy implementation in a given device according to an aspect of the invention. In this table it is shown that for the particular applications, which are installed and started at least once, given OS specific port numbers are assigned. For each started application, application specific source port numbers, P_APP, are assigned according to embodiments of the invention under and within the port space limitations defined in the PPOL, shown in FIG. 6. For instance, for the application Zolo, the OS assigns an OS specific port, P-OS, 0950 to the app Zolo. Subsequently, an app specific source port, P_APP, 40003, which is within the assignable space 40001-5000, is assigned for the given application. The destination port, P_SERV, depends on the server which the app is meant to interact with and will be determined according to known procedures in the art.

Figures 8, 9:
FIGS. 8-9 are exemplary tables relating to a port policy according to still other aspects of the invention.

FIG. 8-9 are exemplary tables relating to a port policy according to still other aspects of the invention. FIG. 8 shows a global master table, PPOL_MASTER, relating to all apps for which services needs to be defined and acted upon. It will be understood that this table will be updated and revised as apps and services are changed in the course of time. In FIG. 8, the address space for the example applications shown in FIG. 6 are further refined according to what can be defined as respective services or action types for the app in question. For instance, for the app Zolo, three services are defined—a parental control; type, PAR CTRL, a deep packet inspection type, DPI, and a high packet speed streaming mode type, HISTRM, is defined. The same applies for the exemplary applications Netflix and Skype, which will therefore not be described in further detail. For a specific application and action type, a specific assignable port space is defined, which, by example for Zolo PAR CTRL, ranges from 4050 to 40051. The range may also only include a single port number.

From the master table PPOL_MASTER shown in FIG. 8, a sub selection, PPOL_SUBS may be made as shown in FIG. 9. This subs selection will include specific services or categories which will enable specific services or action types, which is appropriate for the device or subscriber in question.

It will be understood that a sub selection from the master PPOL can also be made up for several devices or actions and services being defined for a given network segment or area or an operator.

Figure 10:
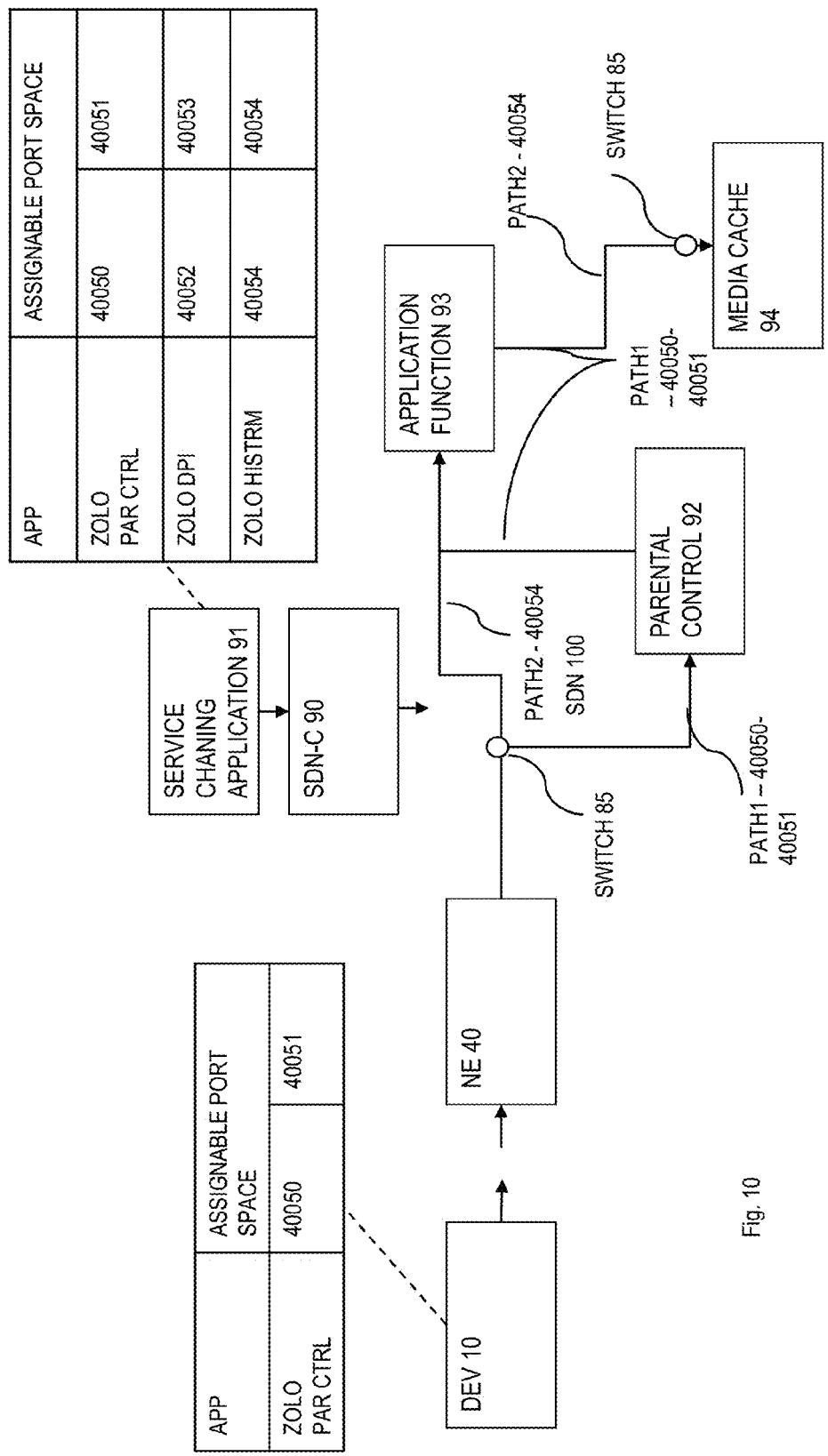
FIG. 10 is an exemplary routing illustration relating to the embodiments shown in FIGS. 4 and 5, FIG. 11-12 relate to details according to aspects of the invention concerning exemplary TCP and UDP packet headers.

FIG. 10 is an exemplary action type/routing illustration relating to the embodiments shown in FIGS. 4 and 5.

In FIG. 10, such a service dependent routing path is shown by way of example.

For the application Zolo and the service parental control, PAR CTRL, of the app Zolo, the assignable port space is defined as falling in the space, source port number, 40050-40051 for the device DEV. Hence, this table in the device DEV represents the PPOL_SUB. The service chaining application 91 is provided with a master table PPOL_MASTER or a table construed for a plurality of devices and which service chaining application, by way of example, has knowledge about the assignable space for all the services or actions possible for the application Zolo. For instance, for the service HISTRM for Zolo, the source port number 40054 can be expected. On the other hand, for the service parental control, PARCTRL, source port numbers 40050 and 40051 can be expected. As illustrated in FIG. 10, for the different traffic types, traffic is routed, by appropriate set up of forwarding tables in switches 85, in the SDN 100 by identifying the source port numbers for the traffic, specifically for the application specific traffic 114 and 110, shown in FIGS. 4 and 5. According to the FIG. 10 example, the traffic having source ports 40050-40051 are routed via a first path, PATH1 and the traffic with source port 40054 is routed via as second path, PATH2. As appears the traffic subject to age restrictions are routed through parental control server 92 whereas high speed stream traffic is not.

Figures 11, 12, 13:
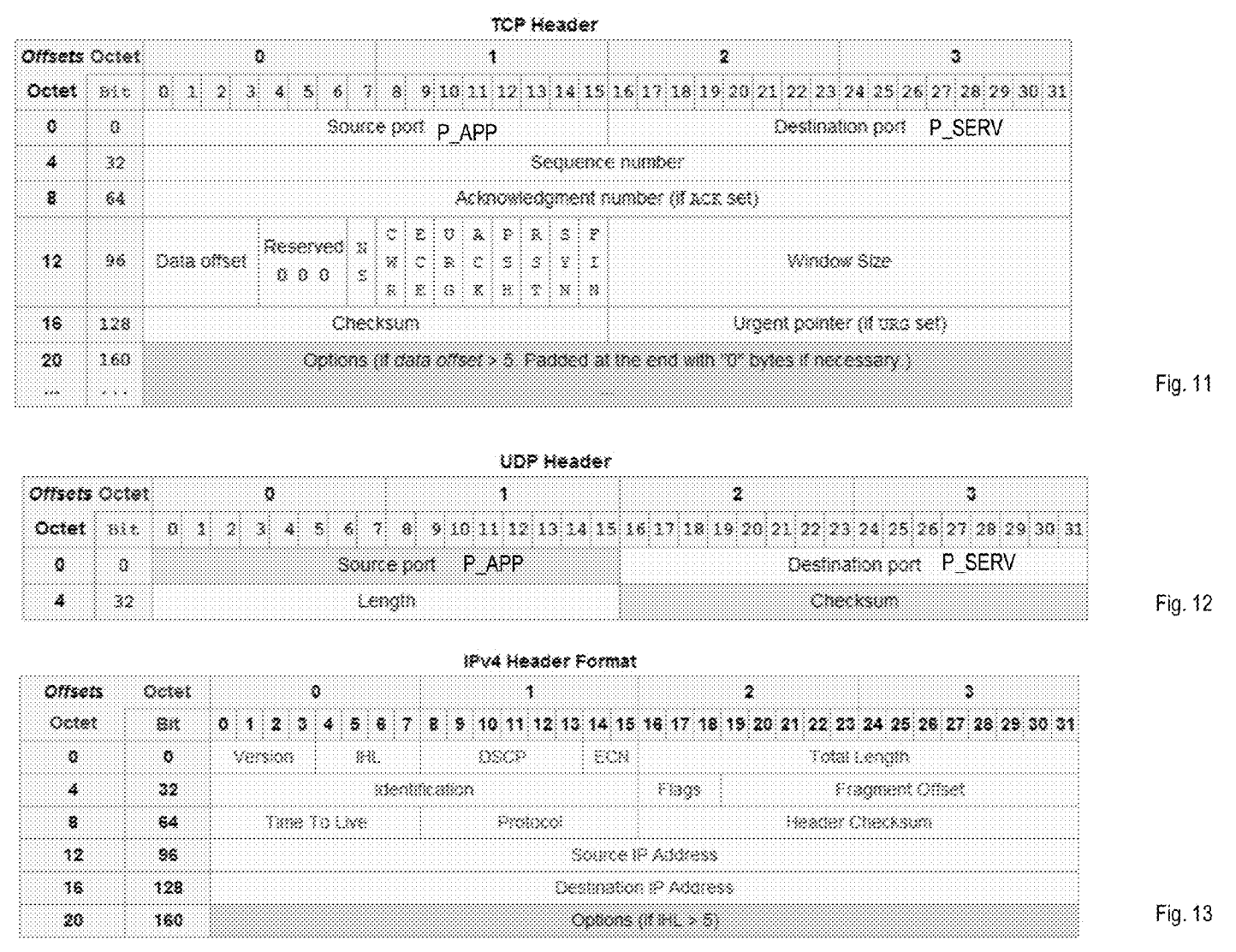

FIG. 11-12 relate to details according to aspects of the invention concerning exemplary TCP and UDP packet headers. As is known, internet traffic in wireless and wired networks may at least include packets being based on an IP header followed by either a TCP or UDP header. According to embodiments of the invention, as indicated in FIG. 11, a TCP header is manipulated such that a OS specific source port is replaced with a specific other source port denoted P_APP according to embodiments of the invention, while a destination port, P_SERV, for given server indicated remains unchanged at least under the step of manipulating the source port.

FIG. 13 shows a known IPv4 header format. This format may be used in a known manner according to the invention. For any of the system, the network entity, the device, the port policy entity, switch or any method according to any of the embodiments of the invention, the internet packet may be formatted using Internet Protocol (IP), and one of Transmission Control Protocol (TCP) and User Datagram Protocol (UDP).

Figure 14:
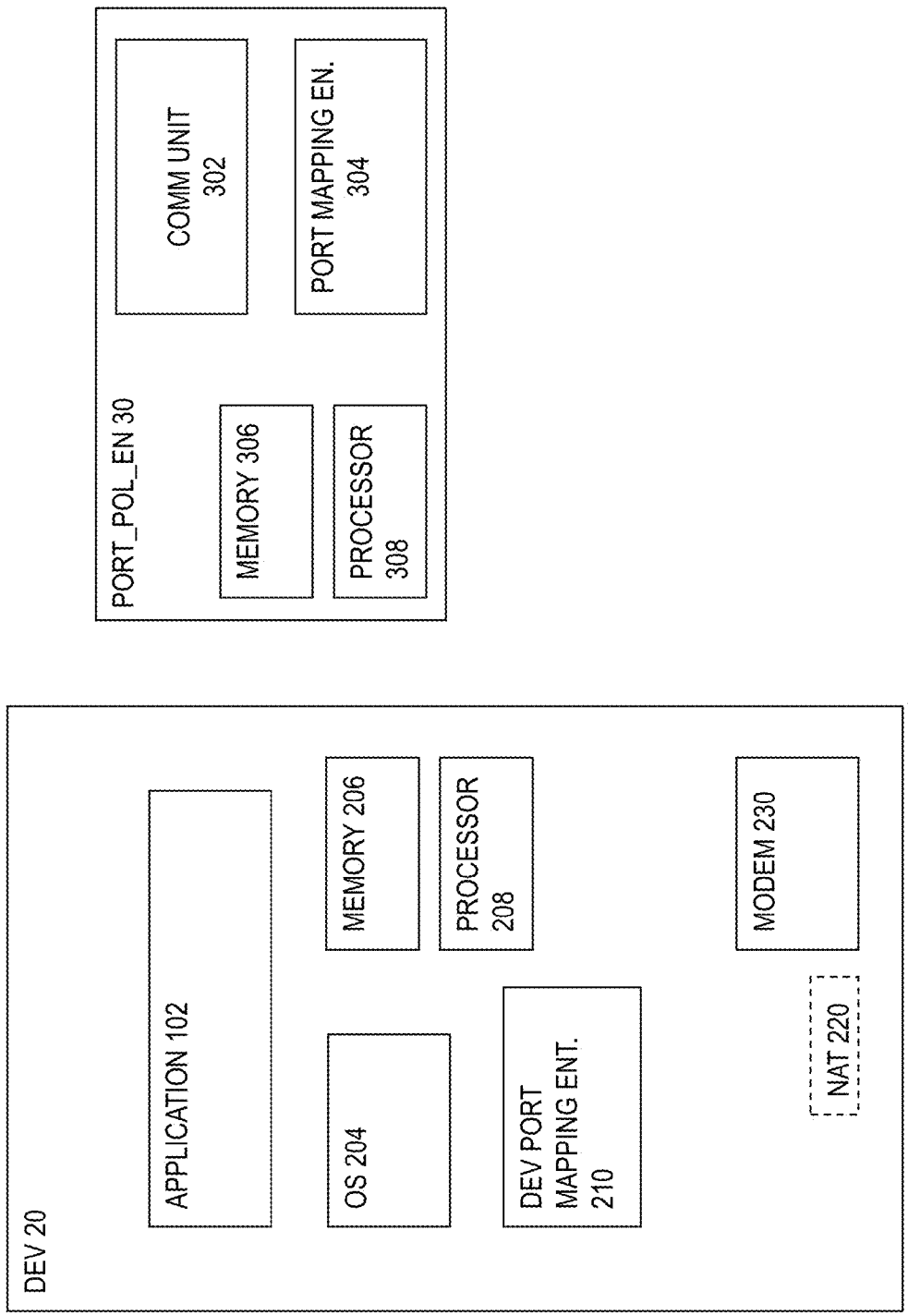
FIG. 14 shows a terminal device and a port policy entity according to further embodiments of the invention.

FIG. 14 shows a terminal device and a port policy entity according to further embodiments of the invention for carrying out the methods indicated above. The device 20 comprises a memory 206 and a processor 208 adapted to carry out instructions executable by the processor under cooperation with an operating system OS 204, such as further executing operating instructions according to an application 102. The device may comprise a device port mapping entity 201 adapted for holding a PPOL. Moreover a modem 230 may be provided for communicating with network entities. The modem may comprise a NAT function 220 according to embodiments of the invention. The NAT function may also be carried out by the OS 204. In the context of the present invention, the term NAT shall be used in the sense of providing at least port translation as explained above. Known, Network Address Translation, NAT, functions, may be modified to perform the port translation explained above, possibly in addition to the known network address translation; hence in the present context we shall refer to this function as NAT, although an address translation may not necessarily be involved for embodiments of the invention.

A port policy entity 30 is moreover provided comprises a memory 306 and a processor 308 adapted to carry out instructions stored in the memory as defined by the method steps explained above. The port policy entity may comprise a communication unit 302 and a port mapping entity 304 for holding a PPOL.

Figure 15:
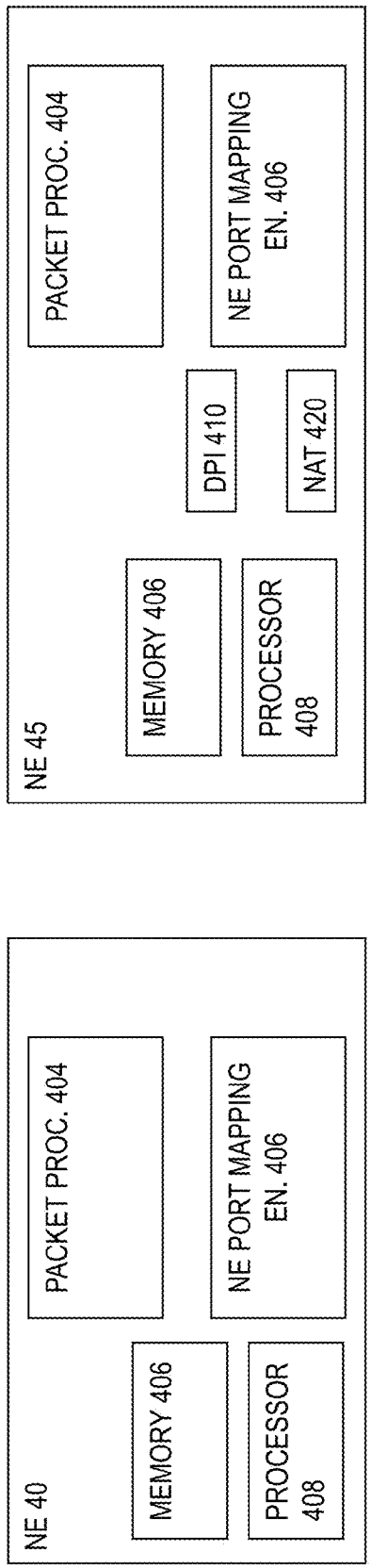
FIG. 15 shows variants of network entities according to further embodiments of the invention.

FIG. 15 shows further network entities 40 and 45 according to further embodiments of the invention.

A network entity 40 is provided comprises a memory 406 and a processor 408 adapted to carry out instructions executable by the processor as defined by the method steps defined above. The network entity may comprise packet processing means 404 for performing gateway functions relating to the packer streams transferred, e.g. PGW and GGSN functionality. It may also comprise a specific NE port mapping entity 406 for holding the PPOL.

A network entity 45 is moreover provided comprising the same means as network entity 40 and in addition a DPI unit 410 and a NAT unit 420.

The following apparatuses are provided according to embodiments of the invention:

A device, DEV 20, such as a terminal device, comprising a memory 206 and processor 208, the processor being adapted for executing an operating system, OS 204, whose instructions are stored in the memory, 206, through which OS an application, APP, can further be executed, the application permitting packet data to be provided to or from the device and a server, the OS 204 interacting with the APP using OS specific port numbers when executing the APP, the device being operative to receiving 101 information PA_NOT concerning a port mapping policy PPOL that specifies a plurality of applications, wherein for each application a predetermined assignable port space is defined within which an application specific port P_APP can be assigned;

starting 105 an application APP_S;

having an OS specific port P_OS assigned 107 to the started application APP_S;

assigning 109 an application specific port P_APP for the OS specific port P_OS in accordance with the port mapping policy PPOL;

translating 112, for traffic relating to the stated application 110, internet packets P to be transmitted for the started application, such that for a OS specific source port P_OS, the OS specific source is exchanged with the assigned application specific port P_APP. In other words, the prevalent source port number belonging to the OS specific application in the source field is swapped with assigned source port number. Subsequently transmitting 114 the translated traffic with the assigned application specific source port, P_APP.

A port mapping policy entity PORT_POL_EN, 30 comprising a memory 306 and a processor 308 adapted to carry out instructions stored in the memory, the port mapping policy entity being operative to defining a port mapping policy PPOL that specifies a plurality of applications, wherein for each application a predetermined assignable port space is defined within which an application specific port P_APP can be assigned, transmitting 102 the port mapping policy to a network entity 40; 45.

The Port mapping policy entity PORT_POL_EN, 30 may further be operative to transmitting 101 the port mapping policy, or a subset thereof, to a device 20.

The port mapping policy transmitted to the device may constitute a subset PPOL_SUBS of the received port mapping policy PPOL_MASTER.

The Port mapping policy entity PORT_POL_EN, 30 may further be operative to transmitting 101 the port mapping policy to switches 85 in a software defined network, SDN 100.

A network entity NE, 40, comprising a memory 406 and a processor 408 adapted to carry out instructions stored in the memory, the network entity being operative to communicating internet traffic between servers on the internet and a device 10, 20, the network entity being operative to receiving 102 a port mapping policy PPOL, that specifies a plurality of applications, wherein for each application a predetermined assignable port space is de-fined within which an application specific port P_APP can be assigned, receiving 114 traffic such as application session traffic, identifying 115 source port numbers for the traffic, performing 116 application specific actions for the received traffic based on the source port identified for the traffic.

The application specific actions may comprise at least one of dedicated bearer establishment, QoS setting, zero charging.

A network entity NE, 45, comprising a memory 406 and a processor 408 adapted to carry out instructions stored in the memory, and comprising a DPI unit 410 and a NAT unit 420;

the network entity being operative to communicating internet traffic to and from servers on the internet and to and from a device (10, 20, and further to receiving (102 a port mapping policy (PPOL, that specifies a plurality of applications, wherein for each application a predetermined assignable port space is de-fined within which an application specific port P_APP can be assigned, receiving 110 traffic, such as application session traffic, performing 111 deep packet inspection, DPI, on the received traffic, identifying a started application for which an OS specific port P_OS has been assigned 107 to a started application APP_S, assigning 109 an application specific port P_APP for the OS specific port P_OS in accordance with the port mapping policy PPOL;

translating 112, for traffic relating to the stated application 110, internet packets P to be transmitted for the started application, such that for a OS specific source port P_OS, the OS specific source is exchanged with the assigned application specific port P_APP, transmitting 114 the translated traffic with the assigned application specific source port.

The network entity NE 45 may moreover be functioning as a Packet Data Network (according to Long Term Evolution/SAE System Architecture Evolution) or a GPRS (General Packet Radio Service) gateway support node.

A switch SW 75 in a software defined network, SDN, 100 wherein the SDN comprises a service chaining application 91 which defines traffic paths in the SDN executed by the switch 75 and further switches 75, the switch being adapted to identifying 115 source port numbers for the traffic, performing 116 application specific actions for the received traffic based on the source port identified for the traffic.

The service chaining application 91 may adapted for receiving a port mapping policy PPOL for at least a plurality of devices, and wherein the service chaining application 91 is controlling the forwarding table of at least the switch 95 so as to control the traffic path for applications defined in the port mapping policy PPOL.

There is moreover provided a system comprising a Device, DEV 20, such as a terminal device, comprising a memory 206 and processor 208, the processor being adapted for running an operating system, OS 204 whose instructions are stored in the memory and through which OS an application, APP, can be executed, the application permitting packet data to be provided to or from the device and a server, a port mapping policy entity PORT_POL_EN, 30, and a network entity NE, 40, adapted for communicating internet traffic between servers on the internet and a device 10, 20, the device being operative to defining a port mapping policy PPOL that specifies a plurality of applications, wherein for each application a predetermined assignable port space is defined within which an application specific port P_APP can be assigned, the port map-ping policy entity PORT_PO-L_EN, 30, transmitting 102 the port mapping policy to a network entity 40; 45.

transmitting 101 the port mapping policy, or a subset thereof, to a device 20.

receiving 101 information PA_NOT concerning a port mapping policy PPOL that specifies a plurality of applications, wherein for each application a predetermined assignable port space is defined within which an application specific port P_APP can be assigned; the device 20, starting 105 an application APP_S;

having an OS specific port P_OS assigned 107 to the started application APP_S;

assigning 109 an application specific port P_APP for the OS specific port P_OS in accordance with the port mapping policy PPOL;

translating 112, for traffic relating to the stated application 110, internet packets P to be transmitted for the started application, such that for a OS specific source port P_OS, the OS specific source is exchanged with the assigned application specific port P_APP, transmitting 114 the translated traffic with the assigned application specific source port, receiving 114 traffic such as application session traffic, by the network entity 40 identifying 115 source port numbers for the traffic, performing 116 application specific actions for the received traffic based on the source port identified for the traffic.

The embodiments of the methods may be implemented as a program or a computer program product.

Figure 16:
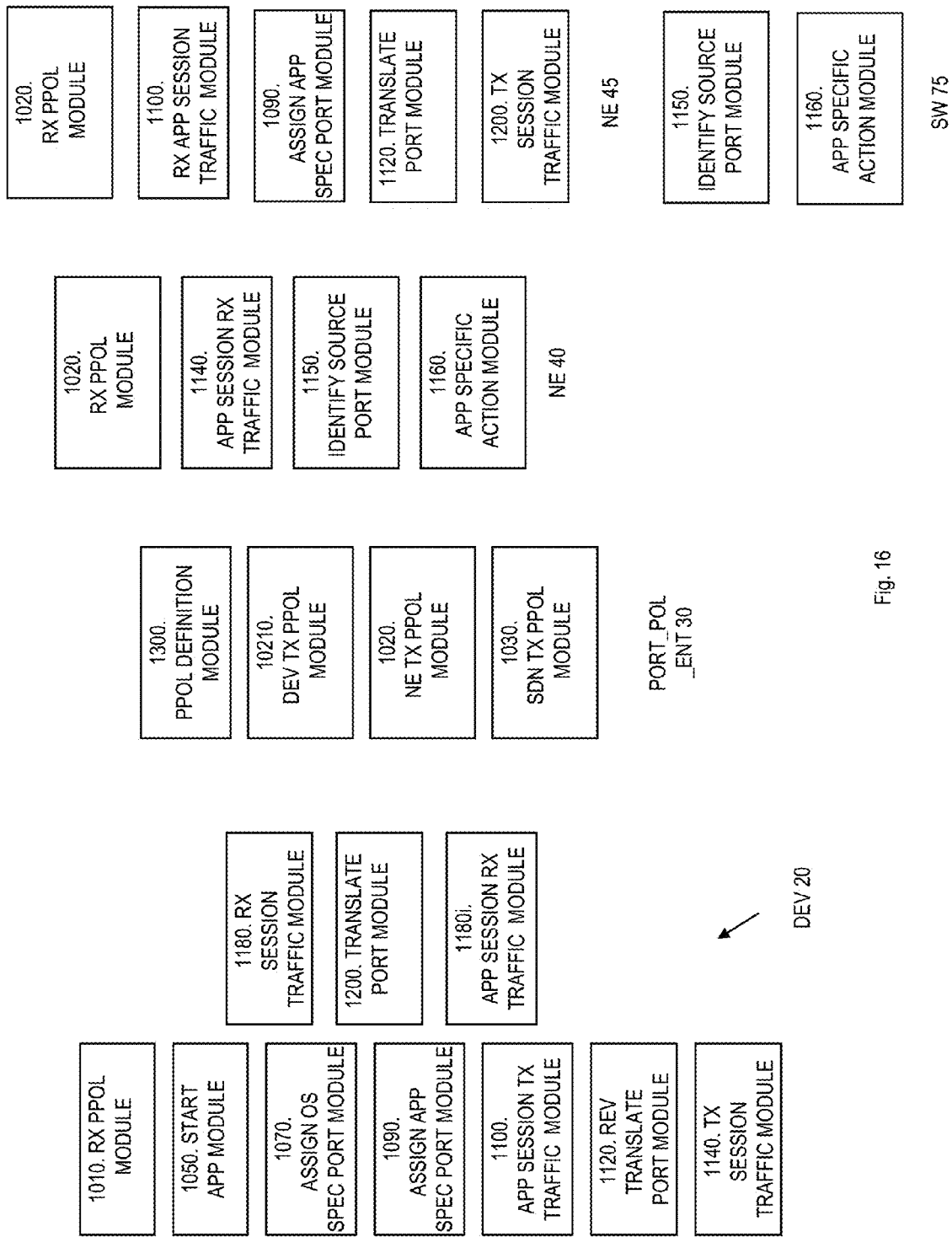
FIG. 16 shows function modules for implementing embodiments of the invention.

Alternatively, the embodiments may be implemented by means of functional modules as explained in the following with reference to FIG. 16.

The device 20 carries out the functions shown in FIGS. 2 and 4 and comprises some or all of the following modules:

A receive PPO module 1010 for carrying out 101, an application start module 1050, for starting the app 105;

an assign OS specific port module 1070, an assign app specific port module, 1090, an application session transfer module, 1100, a translate port module, 1120, a transmit session traffic module, 1140, a receive session module 1180, a reverse translate module, 1200, an application session receive module 1180i.

There is provided a Device, DEV, 20, such as a terminal device, comprising an operating system, OS 204, through which an application, APP, can further be executed. The application is permitting packet data to be provided to or from the device and a server, wherein the OS 204 is interacting with the APP using OS specific port numbers when executing the APP, the device the receive PPO module 1010 being operative to—receiving 101 information PA_NOT concerning a port mapping policy PPOL that specifies a plurality of applications, wherein for each application a predetermined assignable port space is defined within which an application specific port P_APP can be assigned;

the application start module 1050 being operative to—starting 105 an application APP_S;

the assign OS specific port module 1070 being operative to—having an OS specific port P_OS assigned 107 to the started application APP_S;

the assign app specific port module, 1090 being operative to—assigning 109 an application specific port P_APP for the OS specific port P_OS in accordance with the port mapping policy PPOL;

the application session transfer module, 1100, identifying session traffic a translate port module, 1120—being operative to translating 112, for traffic relating to the started application 110, internet packets P to be transmitted for the started application, such that for a OS specific source port P_OS, the application OS specific source port field of packets to be transmitted is exchanged with the assigned application specific port P_APP, the transmit session traffic module, 1140,—being operative to transmitting 114 the translated traffic with the assigned application specific source port.

The port policy entity 30 carries out the functions shown in FIGS. 2-5 and comprises some or all of the following modules:

A PPOL definition module, a device transmission PPOL module, a NE transmission PPOL module, a SDN transmission PPOL module.

A network entity 40 carries out the functions shown in FIGS. 2 and 4 and comprises some or all the following modules:

A receive PPOL module, 1020, an applications session receive traffic module, 1140, an identify source port module, 1150, an application specific action module, 1160.

A network entity 45 carries out the functions shown in FIGS. 3 and 5 and comprises some or all the following modules:

A receive PPOL module, 1020, a receive applications session traffic module, 1100, an assign application specific port module, 1090, a translate port module, 1120, Moreover, a switch 75 is provided as shown in FIGS. 4, 5 and 10 comprising functional modules an identify source port module, 1150, an application specific action module, 1160.

The invention claimed is:

1. A method for operating a device comprising memory and a processor, the processor being configured to run an operating system (OS) through which an application can be executed, the application permitting packet data to be provided to or from the device and a server, the OS interacting with the application using at least OS specific port numbers when executing the application, the method comprising:

receiving information concerning a port mapping policy that specifies a plurality of applications, wherein, for each application, a predetermined assignable port space is defined within which an application specific port can be assigned;

starting an application;

assigning an OS specific port to the started application;

assigning an application specific port for the OS specific port in accordance with the port mapping policy;

translating, for traffic relating to the stated application, internet packets to be transmitted for the started application such that, for a OS specific source port, the OS specific source port is exchanged with the assigned application specific port;

transmitting the translated traffic with the assigned application specific source port.

2. A method for operating a network entity, the network entity configured to communicate internet traffic between servers on the internet and a device, the method comprising:

receiving a port mapping policy that specifies a plurality of applications, wherein, for each application, a predetermined assignable port space is defined within which an application specific port can be assigned;

receiving traffic;

identifying source port numbers for the traffic;

performing application specific actions for the received traffic based on the source port identified for the traffic.

3. The method of claim 2, wherein the application specific actions comprise at least one of:

dedicated bearer establishment;

Quality of Service (QoS) setting;

zero charging.

4. The method of claim 2, wherein the network entity functions as a Packet Data Network node or a Gateway General Packet Radio Service (GPRS) Support Node.

5. A method for operating a network entity, the network entity configured to communicate internet traffic to and from servers on the internet and to and from a device, the method comprising:
- receiving a port mapping policy that specifies a plurality of applications, wherein, for each application, a predetermined assignable port space is defined within which an application specific port can be assigned;
- receiving traffic;
- performing deep packet inspection (DPI) on the received traffic, identifying a started application for which an Operating System (OS) specific port has been assigned to a started application;
- assigning an application specific port for the OS specific port in accordance with the port mapping policy;
- translating, for traffic relating to the started application, internet packets to be transmitted for the started application, such that for a OS specific source port, the OS specific source port is exchanged with the assigned application specific port;
- transmitting the translated traffic with the assigned application specific source port.

6. A computer program product stored in a non-transitory computer readable medium for operating a device comprising memory and a processing circuit, the processing circuit configured to run an operating system (OS) through which an application can be executed, the application permitting packet data to be provided to or from the device and a server, the OS interacting with the application using at least OS specific port numbers when executing the application, the computer program product comprising software instructions which, when executed by the processing circuit, causes the device to:
- receive information concerning a port mapping policy that specifies a plurality of applications, wherein, for each application, a predetermined assignable port space is defined within which an application specific port can be assigned;
- start an application;
- assign an OS specific port to the started application;
- assign an application specific port for the OS specific port in accordance with the port mapping policy;
- translate, for traffic relating to the stated application, internet packets to be transmitted for the started application such that, for a OS specific source port, the OS specific source port is exchanged with the assigned application specific port;
- transmit the translated traffic with the assigned application specific source port.

7. A device, comprising:
- memory;
- a processing circuit operatively connected to the memory;
- wherein the processing circuit is configured to execute an operating system (OS) whose instructions are stored in the memory,
- wherein an application can be executed through the OS, the application permitting packet data to be provided to or from the device and a server;
- wherein the OS is configured to interact with the application using at least OS specific port numbers when executing the application;
- wherein the device is configured to:
  - receive information concerning a port mapping policy that specifies a plurality of applications, wherein, for each application, a predetermined assignable port space is defined within which an application specific port can be assigned;
  - start the application;
  - assign an OS specific port to the started application;
  - assign an application specific port for the OS specific port in accordance with the port mapping policy;
  - translate, for traffic relating to the started application, internet packets to be transmitted for the started application such that, for a OS specific source port, the OS specific source port is exchanged with the assigned application specific port;
  - transmit the translated traffic with the assigned application specific source port.

8. A network entity, comprising:
- memory;
- a processing circuit configured to carry out instructions stored in the memory;
- wherein the network entity is configured to:
  - communicate internet traffic between servers on the internet and a device;
  - receive a port mapping policy that specifies a plurality of applications, wherein, for each application, a predetermined assignable port space is defined within which an application specific port can be assigned;
  - receive traffic;
  - identify source port numbers for the traffic;
  - perform application specific actions for the received traffic based on the source port identified for the traffic.

9. The network entity of claim 8, wherein the application specific actions comprise at least one of:
- dedicated bearer establishment;
- Quality of Service (QoS) setting;
- zero charging.

10. A network entity, comprising:
- memory;
- a processing circuit configured to carry out instructions stored in the memory;
- a deep packet inspection (DPI) circuit;
- a network address translation (NAT) circuit;
- wherein the network entity is configured to:
  - communicate internet traffic to and from servers on the internet and to and from a device;
  - receive a port mapping policy that specifies a plurality of applications, wherein, for each application, a predetermined assignable port space is defined within which an application specific port can be assigned;
  - receive traffic;
  - performing DPI on the received traffic, identifying a started application for which an OS specific port has been assigned to a started application;
  - assign an application specific port for the OS specific port in accordance with the port mapping policy;
  - translate, for traffic relating to the started application, internet packets to be transmitted for the started application such that, for a OS specific source port, the OS specific source port is exchanged with the assigned application specific port;
  - transmit the translated traffic with the assigned application specific source port.

11. The network entity of claim 10, wherein the network entity functions as a Packet Data Network node or a Gateway General Packet Radio Service (GPRS) Support Node.

* * * * *